(12) United States Patent
Bhaskar et al.

(10) Patent No.: US 6,387,263 B1
(45) Date of Patent: May 14, 2002

(54) APPARATUS AND METHODS FOR PREPARING PLASMA SOLUTIONS FROM BLOOD WITH IMPROVED SEPARATION OF PLASMA

(75) Inventors: Gautam Bhaskar, Holywell (GB); Glenn A. Joergensen, Allerod (DK)

(73) Assignee: Bristol-Myers Squibb Company, Princeton, NJ (US)

( * ) Notice: Subject to any disclaimer, the term of this patent is extended or adjusted under 35 U.S.C. 154(b) by 0 days.

(21) Appl. No.: 09/648,796

(22) Filed: Aug. 28, 2000

Related U.S. Application Data

(60) Provisional application No. 60/152,082, filed on Sep. 2, 1999.

(51) Int. Cl.[7] .............................................. B01D 21/26
(52) U.S. Cl. ................................ 210/380.1; 210/360.1; 422/72; 422/101; 436/177
(58) Field of Search ........................... 210/360.1, 380.1; 422/72.101; 436/177

(56) References Cited

U.S. PATENT DOCUMENTS 5,603,845 A * 2/1997 Holm .......................... 210/117

* cited by examiner

Primary Examiner—David A. Reifsnyder
(74) Attorney, Agent, or Firm—Theodore R. Furman, Jr.

(57) ABSTRACT

An improved plasma separation device and method involve the use of a retaining means with a centrifugal plasma separation device for retaining unwanted blood components, e.g., lipids or lipoproteins, from passing from a separation chamber in the device to a collection chamber in the device along with the separated plasma.

15 Claims, 3 Drawing Sheets

APPARATUS AND METHODS FOR PREPARING PLASMA SOLUTIONS FROM BLOOD WITH IMPROVED SEPARATION OF PLASMA

This appplication claims benefit of provisitional application No. 60/152,082 filed Sep. 2, 1999.

BACKGROUND OF THE INVENTION

1. Field of the Invention

The present invention relates to an apparatus and methods for separating plasma from blood and, more specifically, to an apparatus and methods where plasma can be removed from blood without other unwanted blood components including, for example, lipids and lipoproteins which are present in the blood.

2. Description of the Related Art

WO 96/16714 discloses a container for separating a blood or plasma component, e.g., fibrin monomer, from blood or plasma by a centrifugation about a vertical axis. The container comprises a first annular chamber defined by an outer cylindrical wall and an inner cylindrical wall, both walls extending coaxially about a common axis, as well as by a top wall and a bottom wall, where the bottom wall is formed by a piston displace able within the first chamber. The container further comprises a second chamber accommodated below the first chamber and communicating with the first chamber through a first conduit. The second chamber is defined by the outer cylindrical wall, the bottom wall of the first chamber, and by a second bottom wall. This second chamber serves as reaction chamber for receiving plasma and treating the plasma to obtain the desired component.

Placing this container in a centrifuge for the above-described reaction provides that the non-crosslinked fibrin polymer is separated from the plasma and deposited on an outer wall of the reaction chamber during centrifugation. When the piston is subsequently actuated, the remaining plasma is removed from the reaction chamber. Thereafter, a solvent is added for dissolving the so-deposited, non-crosslinked fibrin polymer and forming the desired fibrin monomer solution.

As described in detail in EP 592242 this fibrin monomer solution is extremely useful, for example, in fibrin sealant methods, and it is desirable to use devices like those described in U.S. Pat. No. 5,603,845, WO 96/16713, WO 96/16714 and WO 96/16715 to prepare blood products, such as fibrin sealant components, immediately at the time of surgery so that autologous blood can be utilized.

A disadvantage of some known devices for separating plasma from blood is that when the plasma is removed unwanted components of the blood that are less dense than the plasma, are sometimes also removed with the plasma in undesirable amounts.

SUMMARY OF THE INVENTION

Accordingly, it is an object of the invention is to provide an apparatus and methods for improved separation of plasma from blood, without also removing unwanted components, such as lipids and lipoproteins, from the blood.

This objective and other objectives are achieved by providing an apparatus for separating plasma from blood, the apparatus including a first chamber for centrifuging the blood to obtain the plasma. The first chamber includes an inner wall, an outer wall, a top wall and a bottom wall, the bottom wall being movable in the first chamber from a first position for receiving and centrifuging the blood to a second position for expelling from the first chamber plasma separated from the blood. A retaining means is located in the first chamber for retaining blood components less dense than the plasma in the first chamber when the plasma is being expelled by movement of the bottom wall from the first position to the second position in the first chamber. A second chamber is provided which is in fluid communication with the first chamber, the second chamber receiving the plasma expelled from the first chamber when the bottom wall is moved from the first position.

There is also provided an improved method for separating plasma from blood. Blood is centrifuged in a first chamber to obtain a plasma portion of the blood and additional blood components having a density less than the density of the plasma portion. The plasma portion is then removed from the first chamber while simultaneously retaining in the first chamber the less dense components of the blood.

BRIEF DESCRIPTION OF THE DRAWING

Other features and advantages of the present invention will become apparent when the following description of the invention is read in conjunction with the accompanying drawings, in which FIG. 2 is a diagrammatic view of an apparatus during the handling of a container of the type shown in FIG. 1a,

DETAILED DESCRIPTION OF THE PREFERRED EMBODIMENTS

The present invention provides apparatus and methods for preparing plasma solutions from blood, the plasma solutions being useful for preparing blood products such as fibrin sealant components. In accordance with the present invention, the plasma solutions are advantageously prepared without unwanted relatively low density components of the blood, such as lipids and lipoproteins. In this regard, the present invention is described herein in terms of preparing a solution of a plasma blood component without unwanted lipids and lipoproteins present in the blood. It will be understood, however, that these materials may be only one unwanted blood component that is less dense than the plasma component and that other less dense and unwanted blood components could be removed from the plasma in accordance with the present claimed invention, as would be readily apparent to one skilled in the art.

A basic description of lipids and lipoproteins is provided in the National Cholesterol Education Program Second Report to the Expert Panel on Detection, Evaluation and Treatment of High Blood Cholesterol in Adults (Adult Treatment Panel II), Circulation, Vol. 89, No. 3, pp. 1333–1445, Mar. 1994. As described in this report, cholesterol is a fat-like substance (lipid) that travels in the blood in distinct lipoprotein particles containing both lipid and proteins. As also described in this report, three major classes of lipoproteins are formed in the blood of a fasting individual. These are low-density lipoproteins (so-called "LDL"), high density lipoproteins (so-called "HDL") and very-low-density lipoproteins (so-called "VLDL"). The LDL typically contain 60% to 70% of the total serum cholesterol, the high density lipoproteins normally contain 20% to 30% of the total cholesterol, and the VLDL contain 10% to 15% of the total serum cholesterol along with most of the triglyceride.

As used herein, the terms "lipids" and "lipoproteins" are intended to include the three major classes of lipoproteins described above as well as cholesterol, triglyceride and other fat-like lipid substances.

Figure 1A:
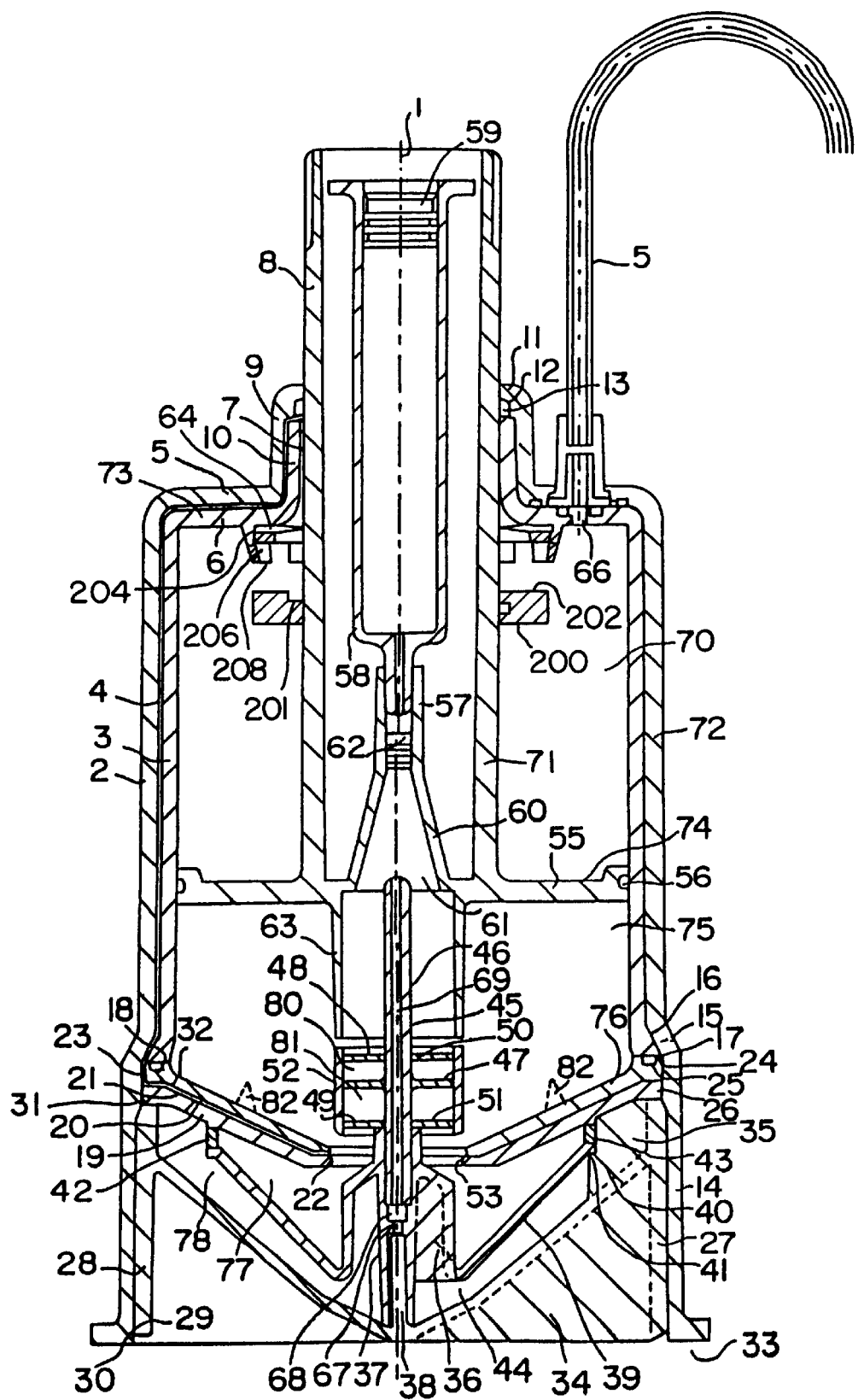
FIG. 1a is an axial sectional view of a container for separating fibrin monomer from blood plasma showing, in cross-section, a retaining ring and collar in accordance with the present invention.

Referring now to the drawings wherein like numbers indicate like elements, there is shown in FIG. 1a a container in accordance with the present invention. The container is built of parts allowing for rotation symmetry and allowing for the container to be placed in a centrifuge apparatus shown in FIG. 2a so as to be centrifuged about a central axis 1. In this regard, known liquid separation apparatus and methods are disclosed in U.S. Pat. Nos. 5,603,845, 5,738,784 and 5,750,657, the disclosures of which are each herein incorporated by reference.

The container of the present invention is preferably of a medical grade plastic material, and polycarbonate material is preferred. For reasons that are discussed below, the material may be light transmissive in a certain wave length range. The container comprises an outer container part 2 and an inner container part 3 which completely fit into each other and everywhere closely abut one another apart from the portion where an axially extending intermediary channel 4 is provided. The channel 4 is provided by a groove shaped in inner container part 3. Container parts 2 and 3 include bottoms 5 and 6, respectively, the bottoms defining a central opening 7 allowing passage of a piston rod 8. About opening 7, the two container parts include axially extending portions 9 and 10, respectively, which extend closely to hollow piston rod 8 in a direction away from the interior of the container parts. Outer container part 2 abuts hollow piston rod 8 along a short radially extending flange 11 provided with a recess 12 receiving a sealing ring 13.

As illustrated in FIG. 1a, channel 4 continues between the inner and the outer container parts all the way from the outer cylindrical walls of the inner and the outer container parts along bottoms 5 and 6 and axial portions 9 and 10 to the opening immediately below sealing ring 13 in opening 7. Axial portion 10 of inner container part 3 abutting the opening 7 is dimensioned such that a narrow, but free passage exists to the interior of the container parts 2 and 3 about hollow piston rod 8.

Outer container part 2 comprises a cylindrical portion of a uniform diameter. Downwardly, when seen relative to FIG. 1a, this portion continues into a cylindrical portion 14 of a slightly larger diameter through a short transition portion 15 forming a frusto-conical inner surface 16. Inner container part 3 ends at the location where transition portion 15 of outer container part 2 continues into cylindrical portion 14 of a larger diameter. The lower end of inner container part 3 comprises an outer surface 17 of a frusto-conical form matching the form of the frusto-conical surface 16 on the inner side of outer container part 2. An outer and an inner annular disk 19 and 20, respectively, are provided immediately below the lower end of inner container part 3, which ends in a radial surface 18. These disks closely abut one another apart from the fact that they define therebetween a channel 21 extending in an axial plane from a central opening 22 and forwards to the inner side of outer container part 2, where the channel 21 communicates with the channel 4 between the outer container part 2 and the inner container part 3 through an axially extending portion 23. Channel 21 and axially extending portion 23 are suitably provided by means of a groove in the side of inner disk 20 facing outer disk 19. The two disks 19 and 20 are shaped with such an oblique course that they comprise substantially inner and outer frusto-conical surfaces and thereby incline downwards towards central opening 22 in a direction away from opening 7 of hollow piston rod 8 in outer container part 2 and inner container part 3. Inner disk 20 also includes a radial surface 24 abutting the adjacent radial surface 18 on inner container part 3. Radial surface 24 of the inner disk 20 is provided with a recess 25 for receiving a sealing ring 26.

The two disks 19 and 20 are maintained in position in abutment against the radial surface 18 of the inner container part 3 by means of a cover 27 closing outer container part 2 in the downward direction. Cover 27 comprises a circumferential sleeve-shaped portion 28 adapted to closely abut the inner side of the outer container part 2, to which it is secured in a suitable manner, such as by way of a snap-action by engagement between a circumferential rib 29 on the outer side of sleeve 28 and a corresponding circumferential groove 30 on the inner side of the outer container part 2. A sealing connection is ensured by means of a sealing ring 31 in a circumferential recess 32 at the outer periphery of outer disk 19. Cover 27 also includes a relatively thin wall 32 adapted to form the lower bottom of the container in the position shown in FIG. 1a. Wall 32 extends substantially along a course parallel to outer and inner disk 19 and 20 in such a manner that wall 32 extends from the inner side of the sleeve 27 in a portion adjacent the disks 19 and 20 and downwards towards a portion substantially on a level with the lower rim 33 of the outer container part 2. In order to reinforce this relatively thin wall 32, a reinforcing radial rib 34 is provided at regular intervals, only one of the ribs appearing from FIG. 1a. Rib 34 is shaped partly with a portion placed outside wall 32 and partly with a portion placed inside wall 32. The latter inside portion is designated reference numeral 35 and is shaped such that it abuts the bottom side of outer disk 19 with the result that it assists in maintaining the disks 19 and 20 in a reliable position.

Partition 36 is located between outer disk 19 and cover 27. Partition 36 comprises a central pipe length 37 which is mounted on a pin 38 projecting axially inwards and being shaped integral with wall 32 of cover 27. Pipe length 37 is shaped integral with a circumferential wall disk 39 extending outwardly from pipe length 37 in such a manner that initially it inclines slightly downwards towards wall 32 of cover 27 whereafter it extends along a short axial course so as to continue into a course extending substantially parallel to wall 32 of the cover. Wall disk 39 ends in a short radially extending periphery 40 resting on a shoulder 41 on rib portions 35 on cover 27. An annular filter unit 42 is located between outer periphery 40 of wall disk 39 and the bottom side of outer disk 19. Annular filter unit 42 abuts a substantially radially shaped surface 43 on the adjacent outer side of the outer disk 19.

In order to ensure stability in partition 36, reinforcing radial ribs designated reference numeral 44 are located between pipe length 37 and wall disk 39.

A capsule designated the general reference numeral 45 is secured in the end opposite cover 27 of pipe length 37 of partition 36. This capsule comprises an elongated pipe length 46 shaped integral with a radial disk 47 and carrying two additional radial and annular disks 48 and 49. Radial disks 48 and 49 are secured by way of friction fit on their respective side of the fixed disk 47. Loose disks 48 and 49 are positioned at their respective distance from fixed ring 47 by means of circumferential shoulders 50 and 51, respectively, on the pipe length 46. The three disks 47, 48, and 49 are all of the same outer diameter and carry along their respective peripheries a circumferential, displaceably mounted sleeve 52.

As illustrated in FIG. 1a, lower disk 49 abuts the upper end of the pipe length 37 of partition 36, whereby the position of the capsule 45 in the axial direction is determined. This position is furthermore determined in such a manner that when displaced in the axial direction the displace able sleeve 52 of the capsule enters a sealing engagement by its lower end, with innermost edge 53 on outer disk 19 in central opening 22. In this position of sleeve 52, a communication still exists between the space inside inner disk 20 surrounding sleeve 52 and the inlet opening to channel 21 between outer disk 19 and inner disk 20. The axial length of displace able sleeve 52 is adapted such that engagement with outer disk 19 occurs before the upper end of sleeve 52 disengages fixed ring 47 during the axial downward displacement of sleeve 52. The inner diameter of the sleeve 52 is also adapted to the outer diameter of the axially extending portion of wall disk 39 of partition 36 in such a manner that a continued downward displacement of the sleeve 52 towards the cover 27 causes sleeve 52 to fixedly engage partition 36 once it has disengaged the outer disk 19. The length of the axial portion of partition 36 corresponds also to the axial length of sleeve 52 in such a manner that sleeve 52 in the lowermost position is substantially completely received by partition 36.

As illustrated in FIG. 1a, the hollow piston rod 8 comprises a circumferential piston 55 inside outer container part 2 and inner container part 3, piston 55 sealingly engaging the inner side of the inner container part 3 through a sealing ring 56.

Luer-coupling 57 is located inside hollow piston rod 8 for receiving a conventional syringe 58 with a piston-acting plug 59 for acting on the content of syringe 58. Coupling 57 is shaped substantially as a pipe length communicating with a central opening 61 in piston 55 through a frusto-conical portion 60. Pipe length 57 is provided with a radially inwardly projecting web 62 for directing fluid leaving syringe 58 away from an axial path and thereby round the elongated pipe length 46 therebelow inside capsule 45. The latter pipe length 46 is of such a length and such dimensions that it can sealingly engage the pipe length 57 inside the hollow piston rod 8 when the piston 55 is in its lowermost position near the cover 27. In order to promote the above sealing connecting, the inner side of the pipe length 57 is formed with a gradually decreasing diameter at the end adjacent the piston 55.

Axially projecting skirt 63 is formed integral with piston 55 about central opening 61 of the piston. Skirt 63 is shaped with such a diameter and such a length that by a suitable displacement of piston 55 it can activate the above displacement of displace able sleeve 52 of the capsule 45 into the positions in which it engages inner rim 53 of central opening 22 through two disks 19 and 20, followed by an engagement of partition 36.

Resilient, annular lip seal 64 is secured about hollow piston rod 8 at the top inside container parts 2 and 3. This lip seal 64 is adapted to prevent an undesired passage of fluid from the interior of the container parts 2 and 3 to channel 4, but it allows passage of fluid when a force is applied through piston 55.

As indicated at the top of FIG. 1a, a connection is provided to a hose 65 through an opening 66 in outer and inner container parts 2 and 3, respectively. This connection is known and therefore not shown in greater detail, but it allows an interruption of the connection to the hose when desired. In addition, an air-escape opening with a suitable filter is provided in a conventional manner and therefore neither shown nor described in greater detail.

Passage 69 is provided from the area between partition 36 and cover 27 and all the way upwards through the interior of pipe length 37 of partition 36 and through the interior of pipe length 46 of capsule 45. Passage 69 allows a transfer of fluid to syringe 58 from this area when pipe length 46 is coupled to pipe length 57 in the interior of piston rod 8. Passage 66 is provided at the lowermost portion of pin 38 in cover 27 by pin 38 being shaped with a plane, axial surface, the pin being of a substantially circular cross section. As a result, a space is provided between the pin and the adjacent portion of the inner side of the pipe length 37. Area 67 is provided immediately above pin 38 where partition 36 presents a slightly reduced inner diameter. In this manner, it is possible to place a small filter 68 immediately above this area, whereby the fluid must pass the filter before it enters pipe length 46 of capsule 45.

The described container comprises a first annular chamber 70 defined inwardly by hollow piston rod 8 forming a cylindrical inner wall 71, and outwardly by a cylindrical outer wall 72 formed by outer container part 2 and inner container part 3. When in the conventional use position of FIG. 1a, annular chamber 70 is upwardly defined by top wall 73 formed by bottoms 5 and 6, respectively, of outer container part 2 and inner container part 3. Downwardly, annular chamber 70 is defined by a bottom wall 74 formed by piston 55. Second chamber 75 is defined below piston 55, the second chamber outwardly being defined by the same cylindrical outer wall 72 as first chamber 70. Downwardly, second chamber 75 is defined by a second bottom wall 76 formed by outer disk 19 and inner disk 20. Capsule 45 is centrally accommodated in the interior of second chamber 75. Third chamber 77 is provided below second bottom wall 76, and third chamber 77 is defined by partition 36 and annular filter unit 42. In addition, third chamber 77 communicates with second chamber 75 through the passage formed by central opening 22 in outer disk 19 and inner disk 20. Finally, fourth chamber 78 is provided below partition 36, fourth chamber 78 being defined downwardly by wall 32 of cover 27 and furthermore by portions of sleeve 28 of cover 27 and the bottom side of outer disk 19.

As described above, the container in question is primarily suited for separation of a component, such as fibrin monomer from blood and, for this purpose, second chamber 75, and preferably upper chamber 80 of capsule 46, is in advance filled with a suitable enzyme, which can catalyze the cleavage of fibrinopeptides A and/or B from fibrinogen, i.e., convert fibrinogen to fibrin, such as batroxobin. As is understood from EP No. 592,242, any thrombin-like enzyme can be employed. Such enzymes include thrombin itself or any other material with a similar activity, such as Ancrod, Acutin, Venyyme, Asperase, Botropase, Crotabase, Flavorxobin, Gabonase, and the preferred Batroxobin. Batroxobin can be chemically bound to biotin, which is a synthetic substance allowing the batroxobin to be captured in a conventionally known manner by means of avidin in an avidin-agarose composition. Accordingly, avidin-agarose is located in lowermost chamber 81 of the capsule. Both the biotin-batroxobin composition and the avidin-agarose composition are relatively easy to fill into respective chambers 80 and 81 inside capsule 45 before the capsule is placed inside the device.

Finally, syringe 58 is located in piston rod 8, syringe 58 containing a pH-4 buffer prepared from an acetate diluted with acetic acid. Syringe 58 is later used for receiving the desired fibrin monomer solution.

Another buffer known from the prior art can also be used. The redissolving buffer agent can be any acid buffer solution preferably those having a pH between 1 and 5. Suitable examples include acetic acid, succinic acid, glucuronic acid, cysteic acid, crotonic acid, itaconic acid, glutonic acid, formic acid, aspartic acid, adipic acid, and salts of any of these. Succinic acid, aspartic acid, adipic acid, and salts of acetic acid, e.g., sodium acetate are preferred. Also, the solubilization may also be carried out at a neutral pH by means of a chaotropic agent. Suitable agents include urea, sodium bromide, guanidine hydrochloride, KCNS, potassium iodide and potassium-bromide. Concentrations and volumes of such acid buffer or such chaotropic agent are as described in EP No. 592,242.

During or immediately after the supply of blood, piston rod 8 is pushed so far into the interior of the container that displace able sleeve 52 of the capsule 45 is moved downwards into a sealing engagement in the through passage through the bottom wall 76 and to the second chamber 77. As a result, access is simultaneously opened to the biotin-batroxobin composition inside the uppermost chamber 80 of the capsule.

When the container is ready for use, a blood sample is fed into the first chamber through a needle not shown and hose 65 in a conventional manner, the blood sample preferably being admixed with an anticoagulant also in a conventional manner. During the feeding of the blood through hose 65 and opening 66 into the interior of first chamber 70, air is removed from the chamber in a conventional manner. After the feeding of blood hose 65 is removed, and opening 66 is sealingly closed. Subsequently, the container with the blood is placed in a centrifuge apparatus which inter alia assists in sealingly compressing the various portions. The centrifuge apparatus is described further below and causes the container to rotate about axis of rotation 1. As a result of the centrifuging, the blood is separated in first chamber 70 into a plasma fraction settling radially inside the remaining portions of the blood, the remaining portions containing the red and the white blood cells disposed in an outermost portion of chamber 70 and components of the blood which are less dense than the plasma which collect in chamber 70 adjacent wall 71. These less dense components include lipids and other unwanted components of the blood for purposes of preparing, for example, a fibrin sealant. As described in EP-PS No. 592,242 the platelets can be present in either the plasma fraction or the fraction disposed in the outermost portion of chamber 70, as desired, by varying the speed and time of centrifugation.

When the interfaces between the plasma and the remaining portions of the blood have been stabilized, i.e., when the separation is complete, a reduction of the volume of first chamber 70 is initiated by piston rod 8 and consequently piston 55 being pulled out. As discussed in more detail below, as a result, first a possible inner layer of air passes through channels 4 and 21 into second chamber 75, and a farther moving of piston 55 results in the plasma passing to second chamber 75. Movement of piston 55 is stopped when the entire layer of plasma has been forced into second chamber 75, i.e., when the interface between the plasma fraction and the remaining portion of the blood disposed in the outermost portion of chamber 70 reaches the relatively less dense components located at inner wall 71 of first chamber 70.

Figure 1B:
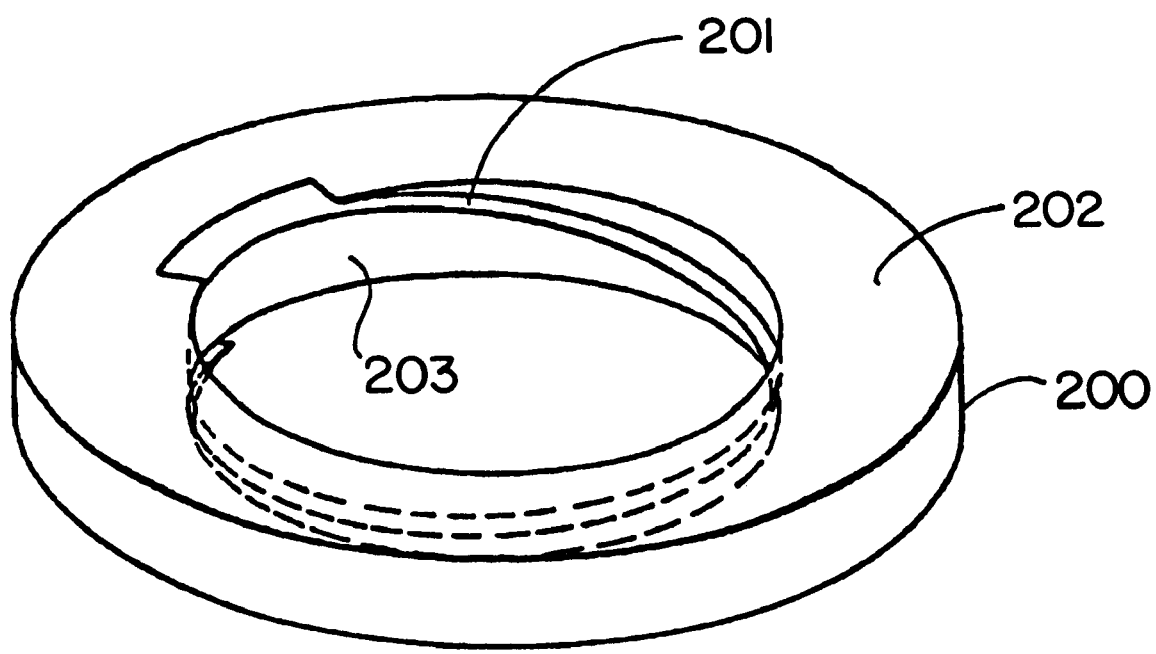
FIG. 1b is a perspective review of the ring illustrated in FIG. 1a, showing a channel extending along the inner surface thereof.

In accordance with the present inventive apparatus and methods, a ring 200 is provided in first chamber 70 in order for the plasma to be removed from first chamber 70 without also removing the relatively less dense unwanted blood components. Ring 200 is oriented about central axis 1, as shown in FIG. 1a, and covers a portion of piston rod 8. Ring 200 may be made of any suitable material such as plastic or rubber, and is releasably held in place on piston rod 8 by a friction fit between an inner surface 203 (shown in FIG. 1b) of ring 200 and an outer surface of wall 71. Collar 204 extends generally downward from wall 73 into first chamber 70 for cooperation with ring 200. Collar 204 includes numerous spaced teeth 206 each of which has a bottom surface 208 for contacting a top surface 202 of ring 200.

As described above, during operation of the centrifuge apparatus, blood in chamber 70 is separated into its components including plasma and, depending on the content of the blood being centrifuged, blood components other than plasma, such as lipids and lipoproteins, accumulate around piston rod 8 along wall 71. It is desirable to remove the separated plasma from first chamber 70 without also removing these other blood components which have accumulated around piston rod 8 during centrifuging. To this end, when piston 55 and piston rod 8 are pulled towards wall 73 in order to expel separated plasma from first chamber 70 through channel 4 to second chamber 75, ring 200 moves along with piston rod 8 due to the friction fit between the inner wall 203 of ring 200 and the outer surface of wall 71 until the top surface 202 of ring 200 contacts bottom surface 208 of teeth 106. When surfaces 202 and 206 come in contact, ring 200, specifically, surface 203 of ring 200, slides along the outer surface of wall 71 of piston rod 8. En this manner, unwanted blood components, such as lipids and lipoproteins which have migrated to a position around piston rod 8 during centrifuging are retained in first chamber 70 by ring 200 at a position underneath ring 200 and along wall 71 when the plasma is expelled therefrom. At the same time, plasma separated from the blood flows from first chamber 70 through the spaces between teeth 206 of collar 204.

During centrifuging of blood in first chamber 70, air may become trapped below ring 200 at a location along wall 71 of piston rod 8. In this event, it is desirable to remove this air from beneath ring 200 in order to maximize the amount of unwanted blood components which are retained beneath ring 200. To allow for release of this trapped air, a channel 201 of suitable dimensions may be provided in the inner surface 203 of ring 200. Channel 201 together with the surface of wall 71 form a passage through ring 200 for the air to flow therethrough. Preferably, channel 201 is helical in shape, i.e., it extends helically through inner surface 203 of ring 200, in order to take advantage of the relative fluid dynamics of air and the unwanted blood components trapped below ring 200. That is, channel 201 is of suitable length and shape such that air, which has a much lower viscosity than the unwanted blood components, will be able to escape from underneath ring 200 through channel 201 while the plasma is being expelled from chamber 70. However, the unwanted blood components will substantially not flow out from channel 201 past ring 200 while plasma is being expelled from first chamber 70.

In second chamber 75, the plasma fraction comes into contact with the enzyme batroxobin with the result that fibrin monomer, which polymerizes immediately to a non-crosslinked fibrin polymer, is released from the plasma fraction. This process is performed while the container is being continuously centrifuged with the result that fibrin polymer is efficiently separated from the remaining portion of the plasma fraction, the fibrin polymer being formed by the reaction of the biotin-batroxobin composition and settling as a viscous layer along cylindrical outer wall 72. When this separation has been completed, the centrifuging is stopped whereby the remaining relatively fluid portion of the plasma fraction can easily be pressed back into the first chamber 70 by piston 55 first being raised for transferring air from first chamber 70 to second chamber 75, followed by piston 55 being pressed down. This transfer can be performed relatively easily and quickly before the viscous layer with fibrin polymer reaches the opening to the channel 21. Further measures can optionally be taken in order to prevent the viscous layer from reaching the inlet of channel 21 too quickly, such as by providing a ring of upwardly projecting teeth 82 shown by dotted lines at bottom 76.

Once the remaining portion of the plasma fraction has been expelled from second chamber 75, displace able sleeve 52 of the capsule 45 is further displaced downwards in such a manner that access is allowed to lowermost chamber 81. At the same time or in connection with the latter displacement of the sleeve, plug or piston 59 of syringe 58 is pressed completely downwards by means of a spindle acting from the outside in such a manner that the pH-4 buffer is transferred to second chamber 75, which can be done while initiating a centrifugal agitation. The addition of the pH-4 buffer provides that fibrin polymer is dissolved therein, and the presence of the avidin-agarose composition in lower chamber 81 inside capsule 45 implies that the biotin-batroxobin composition is bound in a conventional manner by the avidin. Continued displacement of piston 55 causes displace able sleeve 52 on capsule 45 to engage partition 36 and to disengage bottom wall 76 with the result that a free access is provided to third chamber 77. As a result, the contents of second chamber 75 can flow freely downwards into third chamber 77. Preferably, the redissolving is carried out during centrifugal agitation which involves centrifugation and a series of stop-and-start or forward/reverse agitation motions.

Continued centrifuging has the effect that the fibrin monomer solution can be separated in the third chamber through annular filter unit 42 retaining the relatively large particles of agarose and the batroxobin bound thereto. When the fibrin monomer solution has passed into lowermost fourth chamber 78 as a result of the above centrifuging, centrifuging is stopped and the fibrin-I-solution is easily transferred to syringe 58 by a renewed retraction of piston 59, the uppermost end of pipe length 46 of capsule 45 engaging pipe length 57 forming the connection with the syringe 58.

Figure 2:
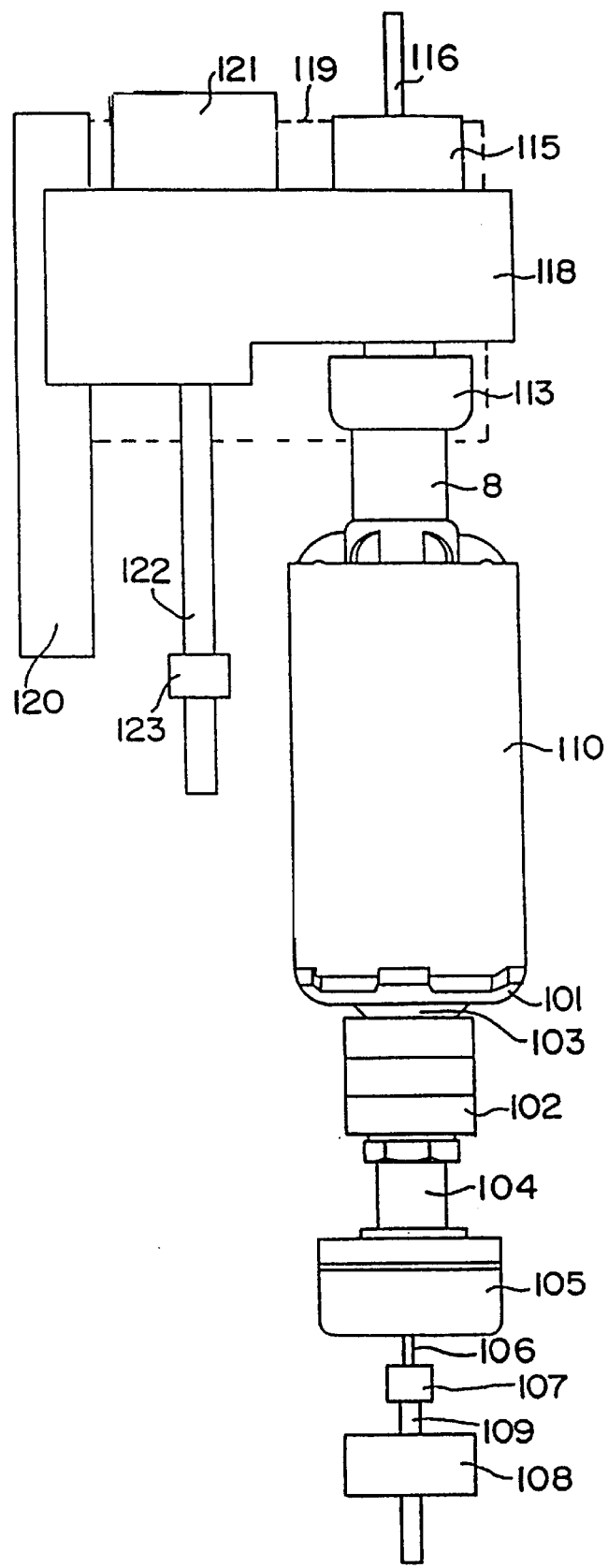

The described handling of the container shown in FIG. 1a is carried out in a centrifuge apparatus of the type diagrammatically shown in FIG. 2.

The apparatus shown in FIG. 2 comprises a supporting turntable 101 which is rotatably journalled in a housing not shown in greater detail by a ball bearing 102.

Supporting turntable 101 is formed integral with a vertical driving shaft 103. Driving shaft 103 is connected through a coupling 104 to a motor 105 causing supporting turntable 101 to follow a rotating movement about a vertical axis of rotation. Activating bar 106 is rotatably journalled coaxially with the axis of rotation inside driving shaft 103 of supporting turntable 101, activating bar 106 being connected through a coupling 107 with a spindle motor 108 and spindle 109 in such a manner that when the spindle motor 108 is activated, activating bar 106 can be displaced vertically upwardly or downwardly in order to engage or disengage a container 110 placed on the supporting turntable 101.

Container 110 is arranged on top of supporting turntable 101, the container being of the type shown in FIG. 1. Piston 55 of container 110 is driven by tubular piston rod 8 projecting upwardly from the upper end of container 110. Piston rod 8 is activated by gripper 113, which in turn is activated by spindle motor 115 through a spindle 116 and an activating bar (not shown) integrally connected thereto. Spindle 116 driven by motor 115 also activates piston 59 of syringe 58 through the activating bar.

Gripper 113 is furthermore rotatably journalled in housing 118 through a ball bearing. Housing 118 and spindle motor 115 are secured to a common carrier indicated by dotted lines at reference numeral 119. Carrier 119 is displaceably mounted on a rail 120 and caused to be vertically displaced thereon by a motor 121. Motor 121 cooperates through a ball spindle with ball nut 123 stationarily secured in the apparatus in such a manner that rotation of ball spindle 122 by motor 121 causes movement of carrier 119 and consequently of gripper 113 along slide 20.

Although the present invention has been described in connection with a preferred embodiment thereof, many other variations and modifications and other uses will become apparent to those skilled in the art without departing from the scope of the invention. It is preferred, therefore, that the present invention not be limited by the specific disclosure herein, but only by the appended claims.

What is claimed is:

1. An apparatus for separating plasma from blood, comprising:

a first chamber for centrifuging the blood to obtain the plasma, the first chamber comprising an inner wall, an outer wall, a top wall and a bottom wall, the bottom wall being movable in the first chamber from a first position for receiving and centrifuging the blood to a second position for expelling the plasma from the first chamber;

retaining means located in the first chamber for retaining blood components having a density less than the density of the plasma in the first chamber while the plasma is being expelled from the first chamber;

a second chamber in fluid communication with the first chamber, the second chamber receiving the plasma expelled from the first chamber when the bottom wall is moved from the first position to the second position in the first chamber.

2. The apparatus according to claim 1, wherein the retaining means surrounds a portion of the inner wall and extends radially outward therefrom.

3. The apparatus according to claim 2, wherein the retaining means comprises a ring releasably secured to the inner wall, and a collar extending from the top wall of the first chamber, the ring having a surface for contacting the collar, and the collar having means for allowing the plasma to flow from the first chamber to the second chamber when the surface of the ring contacts the collar and while the blood components having a density less than the plasma are trapped in the first chamber by the ring.

4. The apparatus according to claim 3, wherein the means for allowing the plasma to flow from the first chamber to the second chamber while the blood components having a density less than the plasma are trapped by the ring comprises a plurality of spaced projections extending from the collar.

5. The apparatus according to claim 3, wherein the ring is releasably secured to the inner wall by a friction fit, the friction fit being breakable to allow the ring to slide along the inner wall when the surface of the ring contacts the collar.

6. The apparatus according to claim 3, wherein the ring comprises air release means for allowing air trapped by the ring in the first chamber to escape to the second chamber.

7. The apparatus according to claim 6, wherein the air release means comprises a passage through the ring for allowing air to flow therethrough.

8. The apparatus according to claim 7, wherein the ring has an inner surface and the passage through the ring comprises a channel in the inner surface of the ring, the channel together with the inner wall defining the passage through the ring.

9. The apparatus according to claim 8, wherein the channel has a length sufficient for air trapped beneath the ring to pass therethrough substantially without the passage therethrough of the blood components having a density less than the plasma.

10. The apparatus according to claim 9, wherein the channel extends helically along the inner surface of the ring.

11. The apparatus according to claim 1, wherein the first chamber is an annularly-shaped chamber.

12. The apparatus according to claim 1, wherein the first chamber is disposed along a central axis of the apparatus.

13. The apparatus according to claim 1, wherein the inner wall and outer wall are both cylindrically-shaped walls.

14. The apparatus according to claim 1, wherein the inner wall comprises a piston rod disposed along a central axis of the apparatus.

15. The apparatus according to claim 14, wherein the bottom wall comprises a piston, the piston being fixedly connected to the piston rod whereby the piston and piston rod move together from the first position in the first chamber to the second position in the first chamber when the plasma is expelled therefrom.

* * * * *